(12) United States Patent
Akita et al.

(10) Patent No.: US 9,676,383 B2
(45) Date of Patent: Jun. 13, 2017

(54) VEHICLE CONTROL DEVICE AND VEHICLE

(71) Applicant: FUJI JUKOGYO KABUSHIKI KAISHA, Tokyo (JP)

(72) Inventors: Mamoru Akita, Tokyo (JP); Jun Kikuchi, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/826,361

(22) Filed: Aug. 14, 2015

(65) Prior Publication Data

US 2016/0090081 A1 Mar. 31, 2016

(30) Foreign Application Priority Data

Sep. 29, 2014 (JP) ................................. 2014-198263

(51) Int. Cl.
*B60W 20/00* (2016.01)
*B60W 10/26* (2006.01)
(Continued)

(52) U.S. Cl.
CPC ............... *B60W 20/40* (2013.01); *B60K 6/46* (2013.01); *B60L 11/1887* (2013.01); *B60W 10/06* (2013.01); *B60W 10/08* (2013.01); *B60W 10/26* (2013.01); *B60W 20/00* (2013.01); *B60W 30/14* (2013.01); *B60W 30/182* (2013.01); *B60W 2510/08* (2013.01); *B60W 2510/244* (2013.01); *B60W 2600/00* (2013.01);
(Continued)

(58) Field of Classification Search
CPC .... B60W 30/14; B60W 30/182; B60W 20/00; B60W 10/06; B60W 10/08; B60W 10/26; B60K 6/46; B60L 11/1887; Y02T 10/7077; Y02T 10/7005
USPC .......................................................... 701/22
See application file for complete search history.

(56) References Cited

U.S. PATENT DOCUMENTS

2005/0256631 A1\* 11/2005 Cawthorne ............. B60K 6/40
701/99
2007/0225890 A1\* 9/2007 Ringlstetter ............ B60T 7/085
701/70
(Continued)

FOREIGN PATENT DOCUMENTS

CN 102358285 A 2/2012
JP 2009-248860 A 10/2009
(Continued)

OTHER PUBLICATIONS

Office Action Received for Chinese Patent Application No. 201510607466.2, mailed on Mar. 3, 2017, 6 Pages of Office Action Including 6 Pages of English Translation.

*Primary Examiner* — Redhwan k Mawari
*Assistant Examiner* — Rodney P King
(74) *Attorney, Agent, or Firm* — Chip Law Group

(57) ABSTRACT

A vehicle control device includes a remaining capacity detecting module that detects a remaining capacity of a secondary battery which supplies an electric power to the drive motor, and a cruise mode switching module that switches a cruise mode from the first cruise mode to the second cruise mode on the basis of the remaining capacity, and switches the cruise mode from the second cruise mode to the first cruise mode on the basis of an external charging.

9 Claims, 8 Drawing Sheets

(51) Int. Cl.

| | |
|---|---|
| *B60W 10/08* | (2006.01) |
| *B60L 11/18* | (2006.01) |
| *B60W 10/06* | (2006.01) |
| *B60W 20/40* | (2016.01) |
| *B60K 6/46* | (2007.10) |
| *B60W 30/14* | (2006.01) |
| *B60W 30/182* | (2012.01) |

(52) U.S. Cl.
CPC ........ *Y02T 10/6217* (2013.01); *Y02T 10/6286* (2013.01); *Y02T 10/7005* (2013.01); *Y02T 10/7044* (2013.01); *Y02T 10/7077* (2013.01); *Y02T 10/7241* (2013.01); *Y02T 10/92* (2013.01); *Y10S 903/93* (2013.01)

(56) References Cited

U.S. PATENT DOCUMENTS

2009/0058326 A1* 3/2009 Oyobe .................. B60K 6/445
    318/53
2009/0101421 A1* 4/2009 Oyobe .................... B60K 6/26
    180/65.29

FOREIGN PATENT DOCUMENTS

| JP | 2011-057115 A | 3/2011 |
|---|---|---|
| JP | 2013-151176 A | 8/2013 |

\* cited by examiner

VEHICLE CONTROL DEVICE AND VEHICLE

CROSS-REFERENCE TO RELATED APPLICATIONS

The present application claims priority from Japanese Patent Application No. 2014-198263 filed on Sep. 29, 2014, the entire contents of which are hereby incorporated by reference.

BACKGROUND

1. Technical Field

The present disclosure relates to a vehicle control device and a vehicle. In particular, the present disclosure relates to a vehicle control device and a vehicle that can switch a first cruise mode in which the vehicle travels on the driving force of a drive motor while a generator is stopped, and a second cruise mode in which the vehicle travels on the driving force of a drive motor while a generator is generating electricity.

2. Related Art

Hybrid vehicles have been known in recent years each of which includes a secondary battery that can be charged by a generator mounted on the vehicle and an external charger in addition to a drive motor that outputs driving force for the vehicle and an engine usable as a power supply for the generator. Some of the hybrid vehicles are controlled to drive a drive motor with only the electric power charged in a secondary battery until the remaining capacity of the secondary battery runs low, and start an engine to begin to generate electricity once the remaining capacity runs low.

For example, Japanese Unexamined Patent Application Publication No. 2009-248860 discloses a hybrid vehicle that acquires the remaining capacity of a secondary battery, and does not allow an engine to start irrespective of the engine temperature but travels in an electrically-operated cruise mode while the remaining capacity is greater than or equal to a control lower limit of the secondary battery.

Hybrid vehicles having such usage are also referred to as range extender vehicles. An engine is used as a range extender (cruising distance extender) in the range extender vehicle. The electric power generated by the power of the engine is supplied to the drive motor, or is charged in the secondary battery. The range extender vehicle is not basically supposed to activate a generator mounted on the vehicle, but travel on only the electric power charged in the secondary battery. The generator begins to generate electricity only when the remaining capacity becomes low in the secondary battery.

For example, until a fully charged secondary battery becomes low, a range extender vehicle travels on only the electric power accumulated in the secondary battery (this cruise mode will also be referred to as "first cruise mode" below). That is to say, the generator does not generate electricity in this period. Meanwhile, once the remaining capacity becomes low in the secondary battery, the range extender vehicle begins to generate electricity and travels on the generated electric power and the electric power in the secondary battery (this cruise mode will also be referred to as "second cruise mode" below).

For example, let us assume that the cruise mode is switched to the second cruise mode, and then switched again to the first cruise mode when the remaining capacity of the secondary battery increases almost to the full, and the first cruise mode and the second cruise mode are repeatedly switched thereafter. Electric power to be charged in the secondary battery is also generated in the second cruise mode in addition to electric power to be supplied to the drive motor. That is to say, electric power unnecessary for the vehicle to travel is also generated by the generator mounted on the vehicle.

Exhaust gas is emitted as a result of an engine operation in the second cruise mode, and switching the cruise mode in the above-described way causes redundant exhaust gas to be emitted because electric power unnecessary for the vehicle to travel is generated. It is desirable to cause an external charger to charge the most of the secondary battery in the range extender vehicle, which can prevent redundant fuel consumption and exhaust gas emission.

SUMMARY OF THE INVENTION

The present disclosure was achieved in view of the disadvantages, and the present disclosure provides a vehicle control device and a vehicle that can cause an external charger to charge the most of a secondary battery of a range extender vehicle, and prevent a generator mounted on the vehicle from generating electricity.

An aspect of the present disclosure provides a vehicle control device capable of switching a first cruise mode in which a vehicle equipped with the vehicle control device travels on a driving force of a drive motor while a generator is stopped, and a second cruise mode in which the vehicle travels on a driving force of the drive motor while the generator is generating an electricity, the vehicle control device including a remaining capacity detecting module that detects a remaining capacity of a secondary battery which supplies an electric power to the drive motor, and a cruise mode switching module that switches a cruise mode from the first cruise mode to the second cruise mode on the basis of the remaining capacity, and switches the cruise mode from the second cruise mode to the first cruise mode on the basis of an external charging.

The vehicle control device may further include an electricity generation mode switching module that sets, in the second cruise mode, an electricity generation execution mode causing the generator to generate an electricity from a time at which the remaining capacity falls below a predetermined lower determination value to a time at which the remaining capacity becomes greater than or equal to a predetermined upper determination value, and an electricity generation stop mode causing the generator to stop generating an electricity from a time at which the remaining capacity becomes greater than or equal to the upper determination value to a time at which the remaining capacity becomes less than the lower determination value.

The generator may use a power of an engine of the vehicle. The cruise mode switching module may switch an engine control mode to a standby mode when the cruise mode is switched to the second cruise mode, and the cruise mode switching module may switch the engine control mode to a sleep mode in which a power consumption is less than a power consumption in the standby mode when the cruise mode is switched to the first cruise mode.

The standby mode may include at least one of processes of monitoring a crank angle of the engine, driving a fuel pressure pump, conducting an electricity to a glow plug, activating a sensor, and conducting an electricity to a heater.

Another aspect of the present disclosure provides a vehicle including any of the vehicle control devices, a drive motor that drives the vehicle, a secondary battery that supplies an electric power to the drive motor, and a generator that generates an electric power to be supplied to at least one of the drive motor and the secondary battery.

BRIEF DESCRIPTION OF THE DRAWINGS

FIG. 4 is a flowchart illustrating a control process executed when an ignition switch is on;

DETAILED DESCRIPTION

Figure 1:
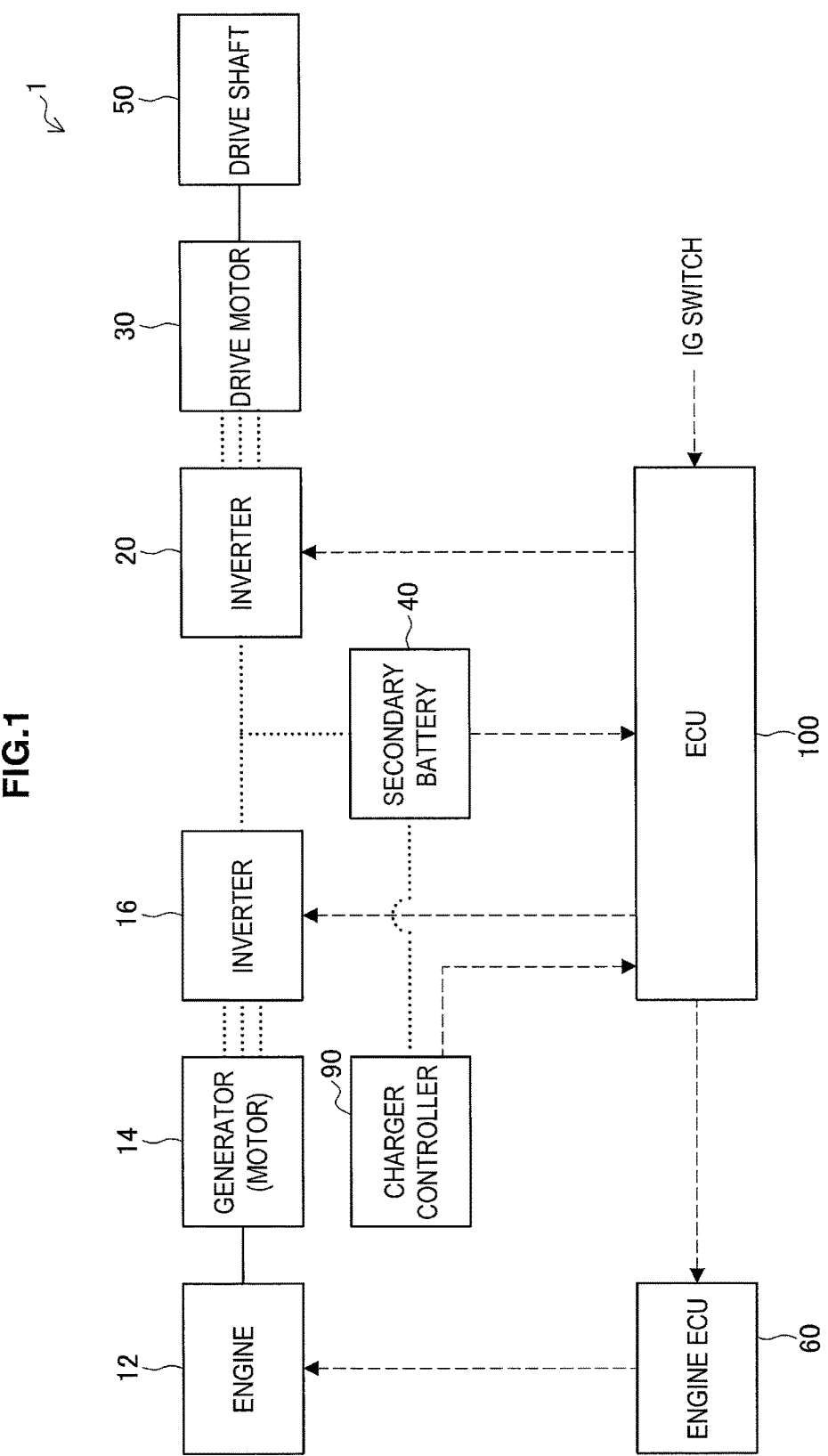
FIG. 1 is a schematic diagram illustrating a schematic configuration of a system of an entire vehicle according to an implementation of the present disclosure.

Hereinafter, preferred implementations of the present disclosure will be described in detail with reference to the appended drawings. Note that, in the present specification and the appended drawings, structural elements that have substantially the same function and structure are denoted with the same reference numerals, and repeated explanation of these structural elements is omitted.

<<1. Entire Configuration Example of System>>

First of all, an example of the entire configuration of a system of an electric vehicle according to an implementation of the present disclosure will be described. FIG. 1 is a schematic diagram illustrating a configuration example of a system 1 of an electric vehicle according to the present implementation. FIG. 1 illustrates power in a solid line, electric power in a dotted line, and an electrical signal in a dashed line.

The system 1 includes a drive system in which a drive motor 30 produces driving force to be provided to a drive shaft 50 of the vehicle, an electricity generating system in which a generator 14 generates electric power to be supplied to the drive motor 30, and an electronic control system that controls the drive system and the electricity generating system. The system 1 is configured as what is called a range extender vehicle, but is also referred to as series-hybrid vehicle, in which an external charger can charge a secondary battery 40.

The drive system chiefly includes the secondary battery 40, an inverter 20, and the drive motor 30. The electricity generating system chiefly includes an engine 12, the generator 14, and an inverter 16. The electronic control system chiefly includes a cruise control device (described as "ECU" in FIG. 1) 100 and an engine control device (described as "engine ECU" in FIG. 1) 60.

The system 1 basically causes the drive motor 30 to produce driving force with only the electric power charged in the secondary battery 40 to exert cruise control over the vehicle (this cruise mode will be referred to as "EV mode" or "first cruise mode" below). Moreover, when the remaining capacity or state of charge (SOC) of the secondary battery 40 falls below a predetermined value SOC_thre, the system 1 causes the drive motor 30 to produce driving force to exert cruise control over the vehicle while causing the generator 14 to generate electric power (this cruise mode will be referred to as "range extend (RE) mode" or "second cruise mode" below).

<1-1. Configuration of Drive System>

The drive motor 30 included in the drive system is connected to the secondary battery 40 via the inverter 20, which converts direct-current power to alternating-current power. The drive motor 30 uses electromagnetic force produced by an electric current supplied from the inverter 20, and the magnetic force of a magnet installed in the drive motor 30 to produce driving force to be provided to the drive shaft 50. The drive motor 30 may also have a regenerative function of converting deceleration energy, which is wasted as thermal energy in deceleration, to electric power to charge the secondary battery 40.

The drive motor 30 is configured as a three-phase AC motor. A three-phase alternating current is supplied to the three-phase winding of a stator coil, thereby producing a rotating magnetic field in the motor. In addition, a permanent magnet installed in the rotor is pulled into the rotating magnetic field, thereby producing torque. The torque produced here is proportionate to the magnitude of an electric current supplied to the motor. The frequency of an alternating current supplied to the motor is set in accordance with the output torque and the rotation speed of the motor.

The secondary battery 40 includes, for example, a secondary battery such as a rechargeable and dischargeable accumulator. A high-voltage secondary battery 40 having a voltage of 200V is used in the system 1 according to the present implementation. The inverter 20 supplies an electric current to the motor winding of the drive motor 30 by applying the voltage of the secondary battery 40 to the drive motor 30. The inverter 20 may include a boost converter.

A charger controller 90 is connected with the secondary battery 40. The charger controller 90 is a device for controlling the charging of the secondary battery 40 by an external charger. The charger controller 90 outputs a detection signal to the cruise control device 100 in detecting a connection to an external charger. For example, when the charging gun of an external charger is inserted into a connector used for charging the secondary battery 40, the charger controller 90 can determine that the external charger charges the secondary battery 40. Alternatively, for a contactless external charger, the charger controller 90 can determine that the external charger charges the secondary battery 40, by using wireless communication with the external charger and a minute electric current for checking whether or not charging is begun.

<1-2. Configuration of Electricity Generating System>

The generator 14 included in the electricity generating system is configured as a device that uses the driving force of the engine 12 to generate electricity. The generator 14 is configured as a three-phase AC motor as with the drive motor 30. The generator 14 is connected to the inverter 20 and the secondary battery 40 included in the drive system via the inverter 16, which converts alternating-current power to direct-current power. The generated electric power is not only supplied to the drive motor 30 via the inverters 16 and 20, but some redundant electric power is also charged in the secondary battery 40. The inverter 16 may be configured as an inverter including a boost converter.

The engine 12 produces power for the generator 14 to generate electricity. Examples of the engine 12 include a gasoline engine and a diesel engine, but are not limited thereto. The generator 14 may serve as a starter using the electric power from the secondary battery 40 when the engine 12 is started.

<1-3. Configuration of Electronic Control System>

The electronic control system of the system 1 according to the present implementation includes the cruise control device 100 and the engine control device 60. Additionally, the electronic control system may have the cruise control device and the engine control device are integrated into a single control device, or have the cruise control device further divided into a plurality of control devices.

(1-3-1. Engine Control Device)

The engine control device 60 includes, for example, a known microcomputer, and exerts drive control over a variety of components related to drive control over the engine 12. Once the cruise control mode is switched to the RE mode (second cruise mode), the engine control device 60 switches an engine control mode to a standby mode. Meanwhile, once the cruise mode is switched to the EV mode (first cruise mode), the engine control device 60 switches the engine control mode to a sleep mode.

A control process is performed in the standby mode for maintaining the engine 12 in a state in which the engine 12 can be quickly started. For example, the crank angle of the engine 12 is monitored, a fuel pressure pump is driven for supplying fuel to the engine 12, electricity is conducted to a glow plug, a sensor such as an oxygen sensor is activated, and electricity is conducted to heaters to heat coolant or the like of the engine 12 in the standby mode. Meanwhile, the control process mentioned above is stopped in the sleep mode, resulting in less power consumption than power consumption in the standby mode.

The engine control device 60 exerts drive control over the engine 12 in the RE mode on the basis of an instruction from the cruise control device 100, and generates necessary electric power. For example, the engine control device 60 exerts fuel injection control, intake air control, or the like over the engine 12. The engine 12 is used for producing power for the generator 14 in the present implementation, and the engine speed or the output torque may be constant or may be switched at a plurality of steps.

(1-3-2. Cruise Control Device)

The cruise control device 100 is a control unit that includes, for example, a known microcomputer. The cruise control device 100 calculates required torque of the drive motor 30 on the basis of an operation amount of a driver on an acceleration pedal and the like. The cruise control device 100 controls the inverter 20 in the drive system on the basis of the calculated required torque, and causes the drive motor 30 to produce desired driving force.

The cruise control device 100 switches the cruise mode of a vehicle equipped with the cruise control device 100 to the EV mode (first cruise mode) or the RE mode (second cruise mode). The cruise control device 100 exerts output control over the drive motor 30 in the EV mode. The cruise control device 100 issues an instruction to the engine control device 60 and controls the inverter 16 in the electricity generating system in addition to the output control over the drive motor 30, and exerts electricity generation control with the driving force of the engine 12 in the RE mode.

Figure 2:
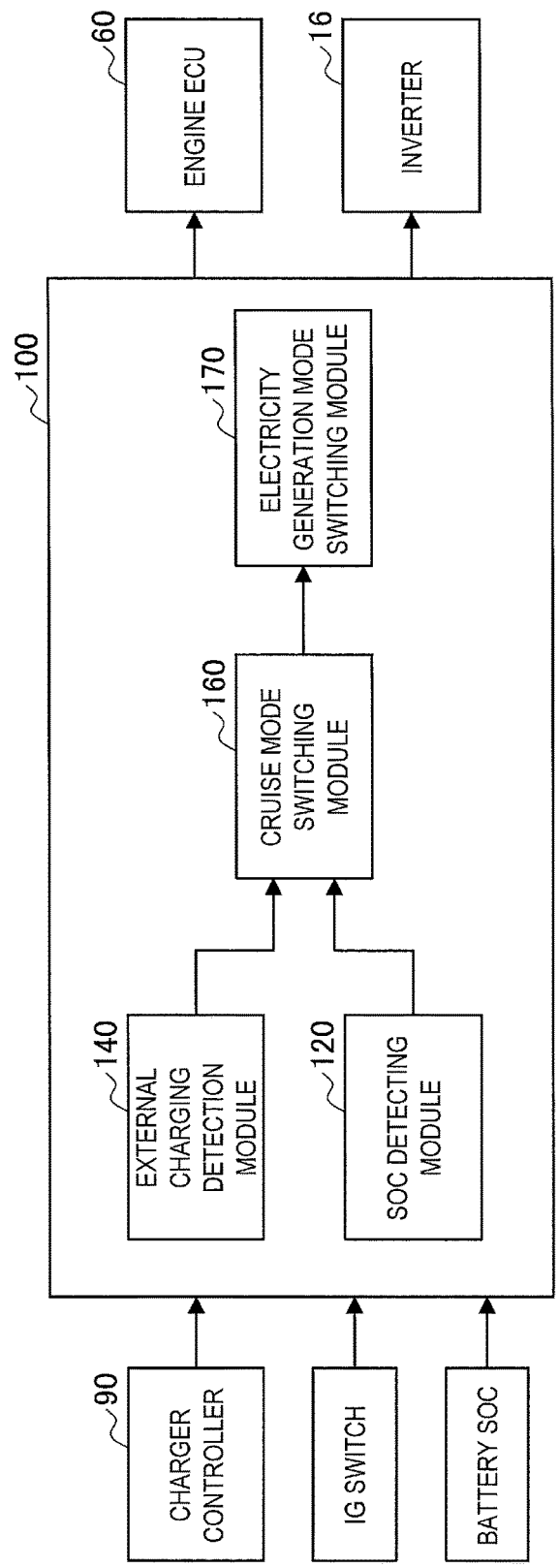
FIG. 2 is a block diagram illustrating a configuration example of a cruise control device.

FIG. 2 is a block diagram functionally illustrating what is related to cruise mode switching in the configuration of the cruise control device 100 included in the electronic control system. The cruise control device 100 includes a remaining capacity (SOC) detecting module 120, an external charging detection module 140, a cruise mode switching module 160, and an electricity generation mode switching module 170. Specifically speaking, the SOC detecting module 120, the external charging detection module 140, the cruise mode switching module 160, and the electricity generation mode switching module 170 may be implemented by a micro controller executing a program.

Moreover, the cruise control device 100 may include a storage device such as random access memory (RAM) and read only memory (ROM), which are not illustrated. The cruise control device 100 receives a signal related to the remaining capacity SOC of the secondary battery 40, a signal indicating that the ignition switch of the vehicle is on or off, a detection signal of the charger controller 90, and the like.

The SOC detecting module 120 reads a signal related to the remaining capacity SOC of the secondary battery 40, and obtains the remaining capacity SOC of the secondary battery 40. The remaining capacity SOC indicates the ratio (%) of the present charged capacity to the maximally charged capacity of the secondary battery 40 in the present implementation. Examples of a signal related to the remaining capacity SOC include sensor signals of a voltage sensor and a current sensor installed in the secondary battery 40. The maximally charged capacity varies in accordance with the temperature Tb of the secondary battery 40, and the SOC detecting module 120 may thus refer to the temperature Tb of the secondary battery 40 to obtain the remaining capacity SOC.

The external charging detection module 140 detects a state in which not the generator 14 mounted on the vehicle, but an external charger is charging the secondary battery 40. The external charging detection module 140 detects, on the basis of a detection signal of the charger controller 90, a state in which an external charger charges the secondary battery 40 in the present implementation.

The cruise mode switching module 160 compares the remaining capacity SOC (%) of the secondary battery 40 detected by the SOC detecting module 140 with a predetermined lower determination value SOC_thre1 (%). The cruise mode switching module 160 then causes the cruise mode to transition from the EV mode to the RE mode when the remaining capacity SOC falls below the lower determination value SOC_thre1. Accordingly, only the electric power charged in the secondary battery 40 is basically used to move the vehicle, until the remaining capacity SOC of the fully charged secondary battery 40 runs low. The vehicle thus travels as long as possible in the EV mode, in which fuel to be supplied to the engine 12 is not consumed or no exhaust gas is emitted.

To the contrary, when the remaining capacity SOC of the secondary battery 40 runs low, the vehicle travels in the RE mode, in which the electric power generated by the generator 14 is used. Once the remaining capacity SOC falls below the lower determination value SOC_thre1, the generator 14 begins to generate electricity in the RE mode, while once the remaining capacity SOC exceeds an upper determination value SOC_thre2, the generator 14 stops generating electricity.

The lower determination value SOC_thre1 may be set, for example, between 1% and 3%. Meanwhile, the upper determination value SOC_thre2 may be set, for example, between 5% and 7%. This allows the vehicle to continue traveling while causing the generator 14 mounted on the vehicle to generate only the electric power necessary for the vehicle to travel, until an external charger begins to charge the secondary battery 40.

The cruise mode switching module 160 transmits an instruction regarding a transition to the standby mode to the engine control device 60 when the cruise mode switching module 160 switches the cruise mode to the RE mode. In the same way, the cruise mode switching module 160 transmits an instruction to the electricity generation mode switching module 170 to begin electricity generation control when the cruise mode switching module 160 switches the cruise mode to the RE mode. Meanwhile, the cruise mode switching module 160 transmits an instruction regarding a transition to the sleep mode to the engine control device 60 when the cruise mode switching module 160 switches the cruise mode to the EV mode.

The cruise mode switching module 160 returns the cruise mode from the RE mode to the EV mode in the present implementation only when the vehicle is connected with an external charger and the external charger charges the secondary battery 40. Thus, after the secondary battery 40 is charged by an external charger, the vehicle travels basically in the EV mode, while after the remaining capacity SOC of the secondary battery 40 runs low, the vehicle travels in the RE mode until an external charger is connected. This allows for environmentally advantageous traveling.

Once the remaining capacity SOC of the secondary battery 40 falls below the lower determination value SOC_thre1 in the RE mode, the electricity generation mode switching module 170 switches the electricity generation mode from an electricity generation stop mode to an electricity generation execution mode. The electricity generation mode switching module 170 transmits an instruction regarding control over the engine 12 to the engine control device 60 in the electricity generation execution mode. The engine 12 is then in the standby mode, and is thus quickly started. Meanwhile, the electricity generation mode switching module 170 controls the inverter 16 in the electricity generating system to exert electricity generation control in the electricity generation execution mode.

Once the remaining capacity SOC of the secondary battery 40 reaches the upper determination value SOC_thre2 in the RE mode, the electricity generation mode switching module 170 switches the electricity generation mode from the electricity generation execution mode to the electricity generation stop mode. Control over the engine 12 and control over the inverter 16 in the electricity generating system are interrupted in the electricity generation stop mode. However, the engine 12 is maintained in the standby mode even in the electricity generation stop mode. In this way, the electricity generating system is controlled in the RE mode in a manner that the remaining capacity SOC of the secondary battery 40 is maintained within a range from the lower determination value SOC_thre1 to the upper determination value SOC_thre2 inclusive.

<<2. Example of Control Method>>

Figure 3:
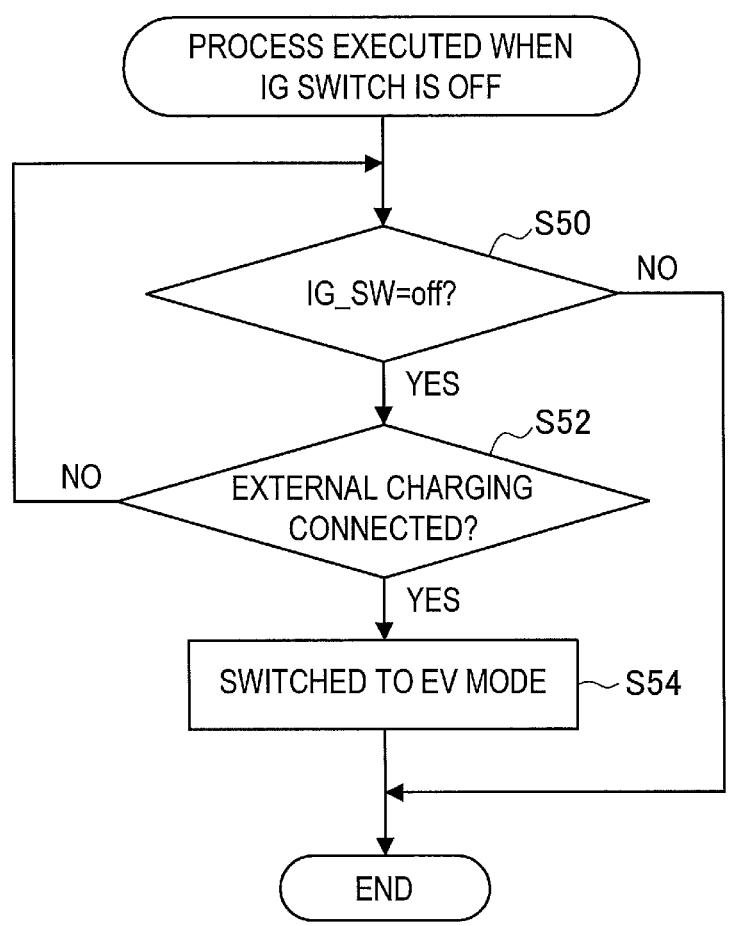
FIG. 3 is a flowchart illustrating a control process executed when an ignition switch is off.
Figure 4:
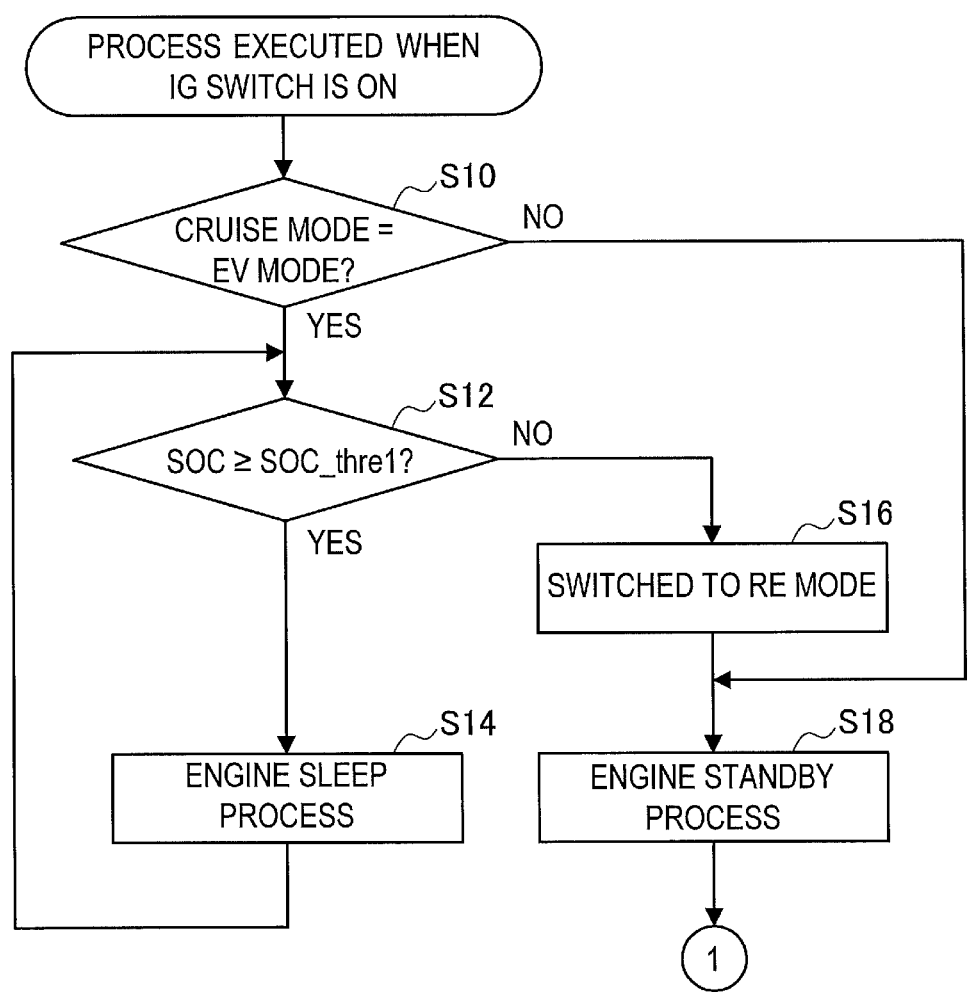
Figure 5:
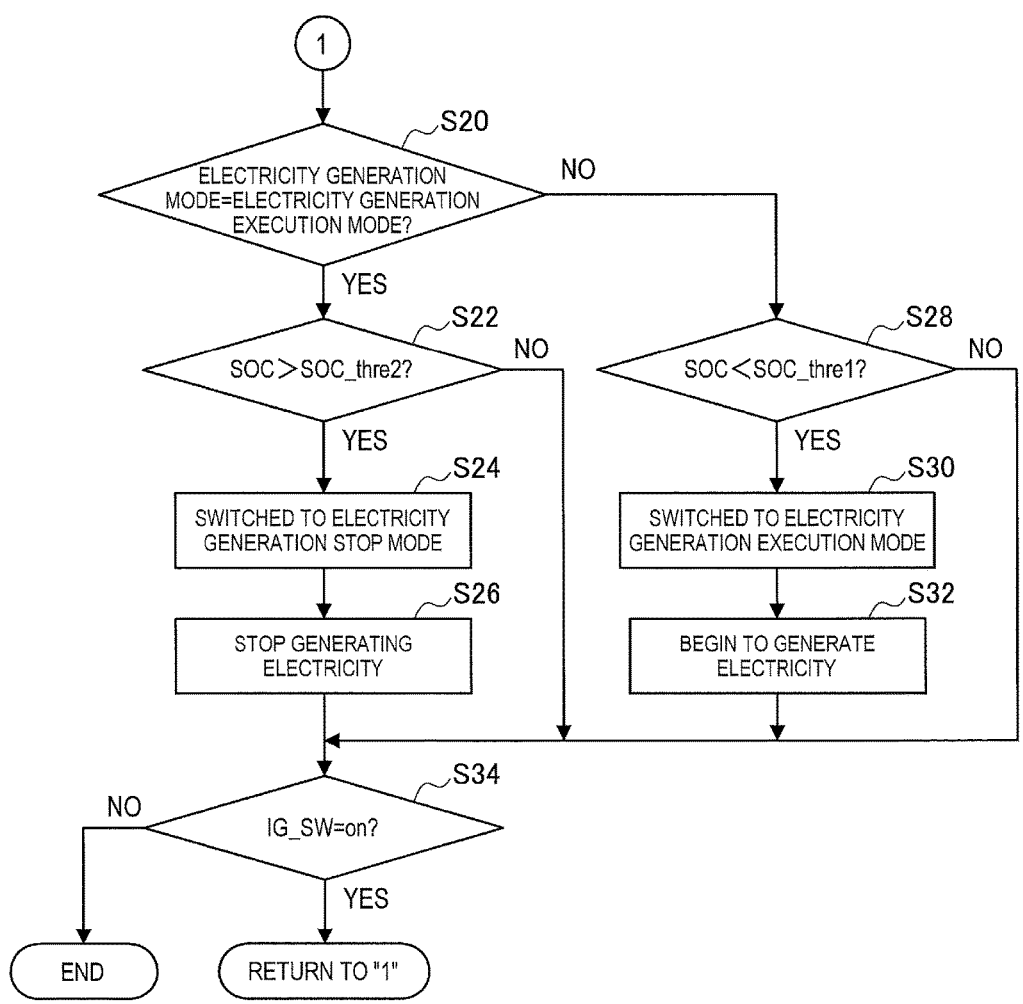
FIG. 5 is a flowchart illustrating a control process in an RE mode.

Next, a control method performed by the cruise control device 100 according to the present implementation will be described. Each of FIGS. 3 to 5 is a flowchart illustrating a control process according to the present implementation. Among them, FIG. 3 is a flowchart illustrating a process executed while an ignition switch is off. Meanwhile, each of FIGS. 4 and 5 is a flowchart illustrating a process executed while an ignition switch is on.

<2-1. Control Process Executed when Ignition Switch is Off>

First of all, with reference to FIG. 3, a process executed while an ignition switch is off will be described. The control process is a determination process for switching the cruise mode from the RE mode to the EV mode. First, in step S50, the cruise mode switching module 160 determines whether or not the ignition switch is off. If the ignition switch is on (S50: No), the cruise mode is not switched from the RE mode to the EV mode and the flow ends.

If the ignition switch is off (S50: Yes), the cruise mode switching module 160 determines, in step S52, whether or not the vehicle is connected with an external charger. For example, when the charging gun of an external charger is inserted into the charging connector, it can be determined that the vehicle is connected with the external charger. Alternatively, for a contactless external charger, the use of wireless communication with the external charger and a minute electric current for checking whether or not charging is begun makes it possible to determine that the vehicle is connected with the external charger. The determination may be made on the basis of a detection signal of the charger controller 90.

If a connection with an external charger is not detected (S52: No), the process returns to step S50 and the determination on a connection with an external charger is repeated while the ignition switch is off. To the contrary, if a connection with an external charger is detected (S52: Yes), the cruise mode switching module 160 returns, in step S54, the cruise mode from the RE mode to the EV mode. Accordingly, the cruise mode returns to the EV mode only when an external charger charges the secondary battery 40.

<2-2. Control Process Executed when Ignition Switch is On>

Next, with reference to FIGS. 4 and 5, a process executed while an ignition switch is on will be described. Once the ignition switch is turned on, the cruise mode switching module 160 determines, in step S10, whether or not the present cruise mode is the EV mode. If the present cruise mode is the RE mode (S10: No), the cruise mode is maintained as the RE mode while the ignition switch is on, so that the flow proceeds to step S18 to perform a process for the RE mode.

Meanwhile, if the present cruise mode is the EV mode (S10: Yes), the cruise mode switching module 160 reads, in step S12, the present remaining capacity SOC of the secondary battery 40 and determines whether or not the remaining capacity SOC is less than a lower determination value SOC_thre1. The lower determination value SOC_thre1 may be set, for example, between 1% and 3%. If the remaining capacity SOC is greater than or equal to the lower determination value SOC_thre1 (S12: Yes), the cruise mode switching module 160 performs, in step S14, an engine sleep process while maintaining the cruise mode as the EV mode, and then the flow returns to step S12. An instruction for switching the engine control mode to an engine sleep mode is transmitted to the engine control device 60 in the engine sleep process.

To the contrary, if the remaining capacity SOC is less than the lower determination value SOC_thre1 (S12: No), the cruise mode switching module 160 switches, in step S16, the cruise mode from the EV mode to the RE mode. Once the cruise mode is switched to the RE mode, the cruise mode switching module 160 performs, in step S18, an engine standby process. If the cruise mode is determined as the RE mode in step S10 (S10: No), the engine standby process is also performed in step S18.

An instruction for switching the engine control mode to an engine standby mode is transmitted to the engine control device 60 in the engine standby process. Accordingly, the engine control device 60 monitors the crank angle of the engine 12, drives a fuel pressure pump for supplying fuel to the engine 12, activates a sensor such as an oxygen sensor, and conducts electricity to heaters to heat coolant or the like of the engine 12 so as to quickly start the engine 12.

The electricity generation mode switching module 170 then determines, in step S20, whether or not the present electricity generation mode is the electricity generation execution mode. If the present electricity generation mode is not the electricity generation execution mode but the electricity generation stop mode (S20: No), the electricity generation mode switching module 170 reads, in step S28, the present remaining capacity SOC of the secondary battery 40 and determines whether or not the remaining capacity SOC is less than the lower determination value SOC_thre1. If the remaining capacity SOC is greater than or equal to the lower determination value SOC_thre1 (S28: No), the electricity generation stop mode is maintained and the flow proceeds to step S34.

To the contrary, if the remaining capacity SOC is less than the lower determination value SOC_thre1 (S28: Yes), the electricity generation mode switching module 170 switches, in step S30, the electricity generation mode to the electricity generation execution mode. The cruise control device 100 then transmits, in step S32, a control instruction to the engine control device 60 and controls the inverter 16 in the electricity generating system to begin to generate electricity. It is decided, for example, on the basis of required electric power of the drive motor 30, which can produce the torque necessary for the vehicle to travel, how much electricity is generated here. After the generator 14 begins to generate electricity, the flow proceeds to step S34.

If the present electricity generation mode is the electricity generation execution mode in step S20 (S20: Yes), the electricity generation mode switching module 170 reads, in step S22, the present remaining capacity SOC of the secondary battery 40 and determines whether or not the remaining capacity SOC exceeds the upper determination value SOC_thre2. The upper determination value SOC_thre2 may be set, for example, between 5% and 7%. If the remaining capacity SOC is less than or equal to the upper determination value SOC_thre2 (S22: No), the electricity generation execution mode continues and the flow proceeds to step S34.

To the contrary, if the remaining capacity SOC exceeds the upper determination value SOC_thre2 (S22: Yes), the electricity generation mode switching module 170 switches, in step S24, the electricity generation mode to the electricity generation stop mode. The electricity generation mode switching module 170 stops, in step S26, electricity generation control by controlling the engine 12 and the inverter 16 in the electricity generating system. After the generation of electricity is stopped, the flow proceeds to step S34.

In step S34, the electricity generation mode switching module 170 determines whether or not the ignition switch remains on. If the ignition switch remains on (S34: Yes), the flow returns to step S20 and the processes are repeated in the above-described procedure. To the contrary, if the ignition switch is turned off (S34: No), the cruise control device 100 terminates the control process.

Until the remaining capacity SOC of the secondary battery 40 runs low, cruise control is exerted in the EV mode with only the electric power charged in the secondary battery 40 in the control process according to the present implementation. If the remaining capacity SOC runs low and falls below the lower determination value SOC_thre1, cruise control is exerted in the RE mode with the electric power generated by the generator 14. The execution and stop of generation of electricity are then switched in a manner that the remaining SOC of the secondary battery 40 is maintained between the upper determination value SOC_thre2 and the lower determination value SOC_thre1. Thus, the generation of electricity is controlled not to exceed the amount of electric power necessary for the vehicle to travel, resulting in less fuel consumption and less exhaust gas emission.

The engine control mode is set as the standby mode in the RE mode in the present implementation, so that it is possible to quickly start the engine 12. Meanwhile, the engine control mode is set as the sleep mode in the EV mode, so that it is possible to lessen power consumption while there is no need to start the engine 12.

<2-3. Time Chart>

Figure 6:
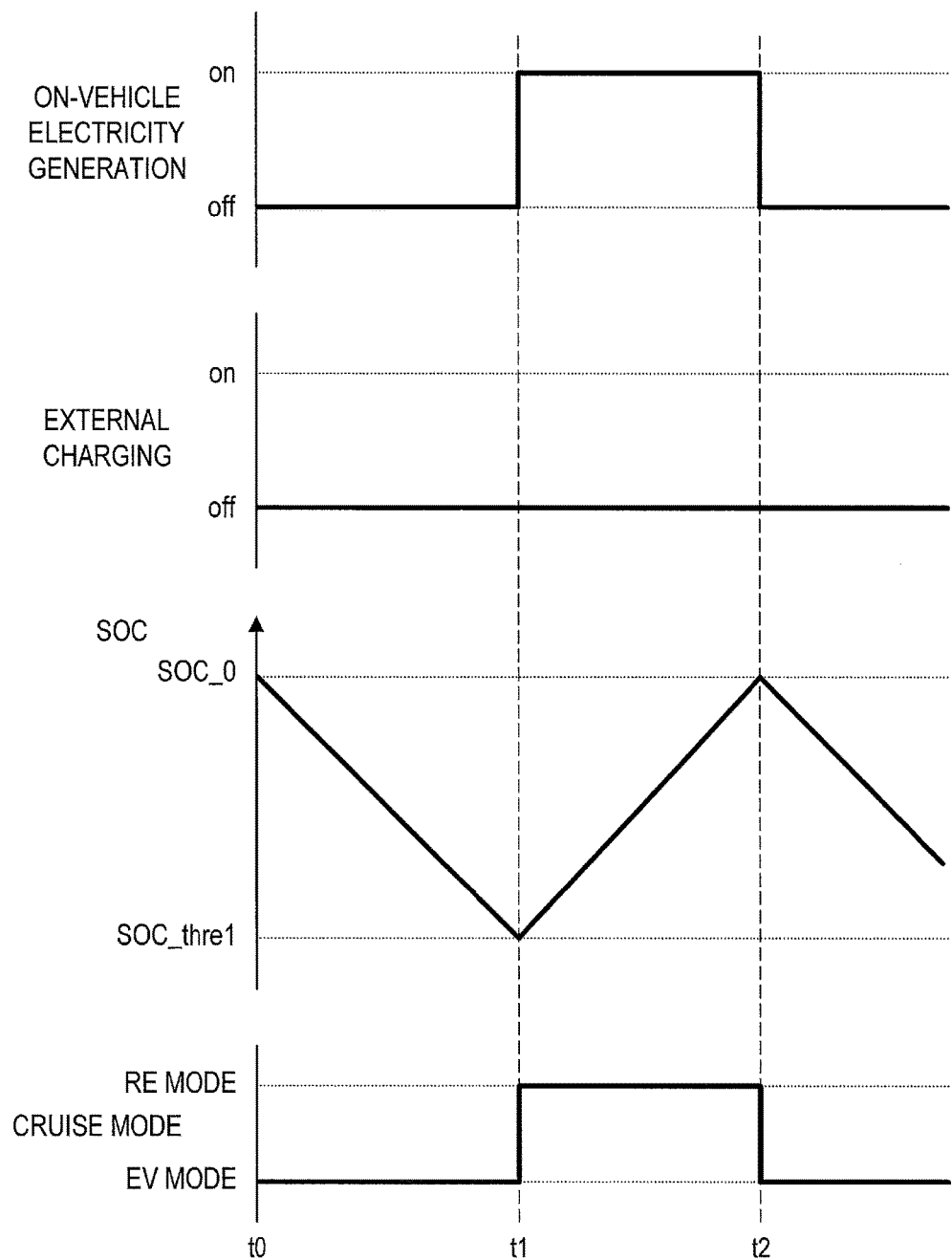
FIG. 6 is a time chart for switching a cruise mode based on remaining capacity.
Figure 7:
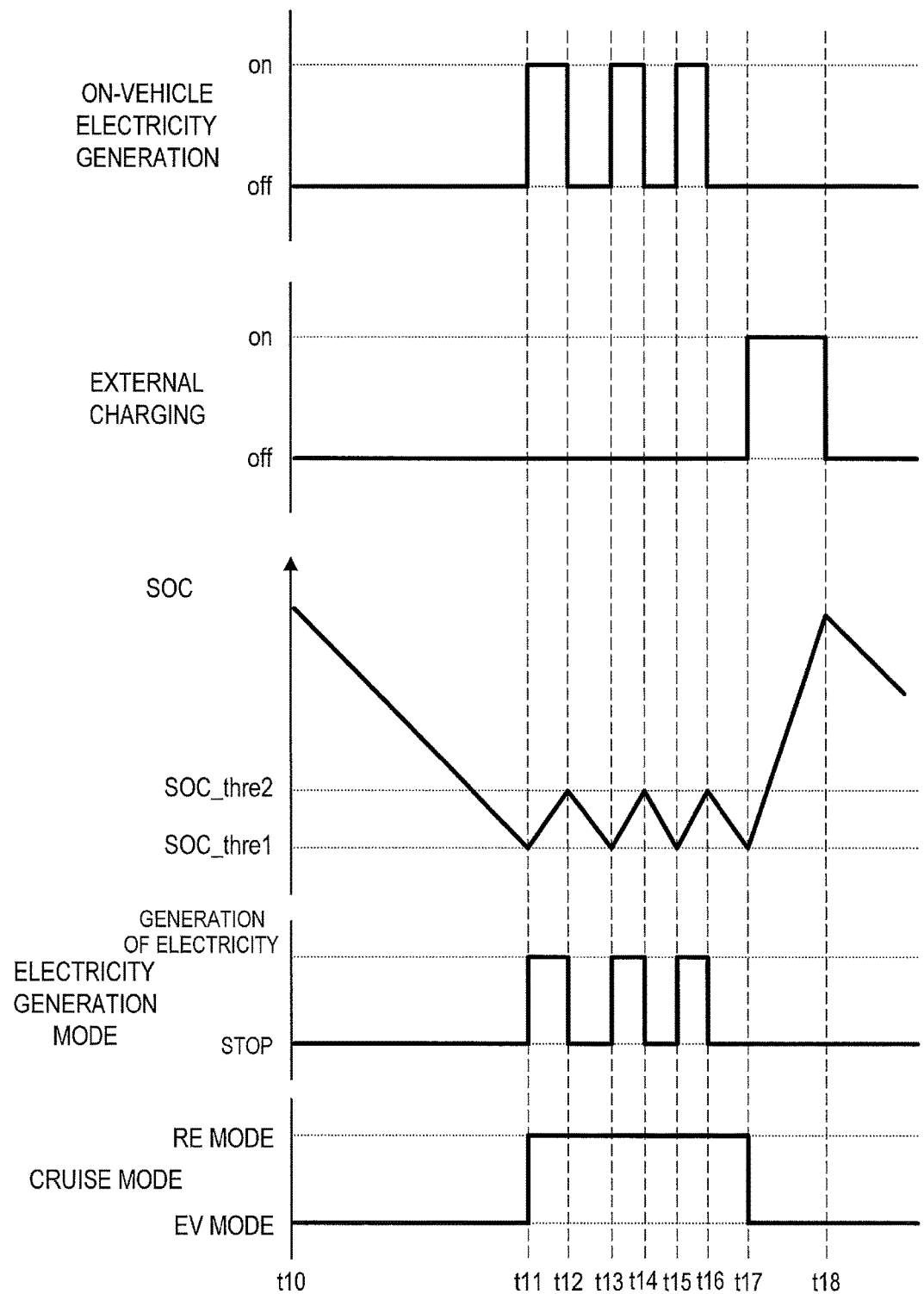
FIG. 7 is a time chart for switching a cruise mode according to the present implementation.

Next, a time chart is used to describe when the cruise mode is switched and how the remaining capacity SOC of the secondary battery 40 transitions if the cruise control device 100 according to the present implementation performs the cruise control process. FIG. 6 is a time chart illustrating an example in which the remaining capacity SOC of the secondary battery causes the cruise mode to be switched even before an external charger is connected. FIG. 7 is a time chart illustrating an example in which the cruise control device 100 according to the present implementation switches the cruise mode.

As illustrated in FIG. 6, if the remaining capacity SOC of the secondary battery causes the cruise mode to be switched, the EV mode continues from time t0 at which the secondary battery 40 is fully charged. Even if the ignition switch of the vehicle is repeatedly turned on and off in the meantime or the use of the vehicle is interrupted, cruise control continues in the EV mode as long as the remaining capacity SOC of the secondary battery 40 does not fall below the lower determination value SOC_thre1.

The cruise mode is switched from the EV mode to the RE mode at time t1 at which the remaining capacity SOC of the secondary battery 40 falls below the lower determination value SOC_thre1. Thereafter, the generator 14 mounted on the vehicle generates electricity, and once the remaining capacity SOC is, for example, made full (remaining capacity SOC=SOC_0), the cruise mode returns to the EV mode and the generator 14 mounted on the vehicle stops generating electricity. Thereafter, the cruise mode is switched on the basis of an increase and a decrease in the remaining capacity SOC.

If an external charger is connected in the meantime, the remaining capacity SOC is made full. However, until then, the generator 14 mounted on the vehicle generates electric power to be charged in the secondary battery 40 in addition to the electric power necessary for the vehicle to travel. Thus, more exhaust gas is emitted with an increase in fuel consumption of the engine 12, which outputs power for the generator 14 in the example of FIG. 6.

Meanwhile, as illustrated in FIG. 7, if the cruise control device 100 according to the present implementation switches the cruise mode, the EV mode continues from time t10 at which the secondary battery 40 is fully charged. Even if the ignition switch of the vehicle is repeatedly turned on and off in the meantime or the use of the vehicle is interrupted, cruise control continues in the EV mode as long as the remaining capacity SOC of the secondary battery 40 does not fall below the lower determination value SOC_thre1 (such as 1 to 3%). Moreover, the engine control mode is maintained as the sleep mode in the EV mode.

The cruise mode is switched from the EV mode to the RE mode at time t1 at which the remaining capacity SOC of the secondary battery 40 falls below the lower determination value SOC_thre1. The engine control mode is maintained as the standby mode in the RE mode. At the same time, the electricity generation mode is switched to the electricity generation execution mode, and the generator 14 mounted on the vehicle begins to generate electricity. The drive motor 30 is driven by the electric power generated by the generator 14 and the secondary battery 40 is charged from time t11 to time t12.

The electricity generation mode is switched to the electricity generation stop mode, and the generator 14 mounted on the vehicle stops generating electricity at the time t12, at which the remaining capacity SOC of the secondary battery 40 exceeds the upper determination value SOC_thre2 (such as 5 to 7%). The cruise mode is then maintained as the RE mode, and the engine control mode is also maintained as the standby mode. Thereafter, the generator 14 mounted on the vehicle repeatedly generates electricity and stops generating electricity in the RE mode from time t13 to time t17. The cruise mode returns to the EV mode at the time t17, at which an external charger is connected, and the secondary battery 40 is fully charged at time t18.

In this way, the remaining capacity SOC of the secondary battery 40 does not considerably exceed the upper determination value SOC_thre2 in the RE mode, and the generation of electricity other than the electric power necessary for the vehicle to travel is prevented in the example of control according to the present implementation.

According to the present implementation as described above, until the remaining capacity SOC of the secondary battery 40 runs low, cruise control is exerted with only the electric power charged in the secondary battery 40. If the remaining capacity SOC runs low and falls below the lower determination value SOC_thre1, cruise control is exerted in the RE mode with the electric power generated by the generator 14. The execution and stop of generation of electricity are then switched in a manner that the remaining capacity SOC of the secondary battery 40 is maintained between the upper determination value SOC_thre2 and the lower determination value SOC_thre1. Thus, the generation of electricity is controlled not to exceed the amount of electric power necessary for the vehicle to travel, resulting in less fuel consumption and less exhaust gas emission.

The engine control mode is set as the standby mode in the RE mode in the present implementation, so that it is possible to quickly start the engine 12. Meanwhile, the engine control mode is set as the sleep mode in the EV mode, so that it is possible to lessen power consumption while there is no need to start the engine 12.

Although the preferred examples of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

Figure 8:
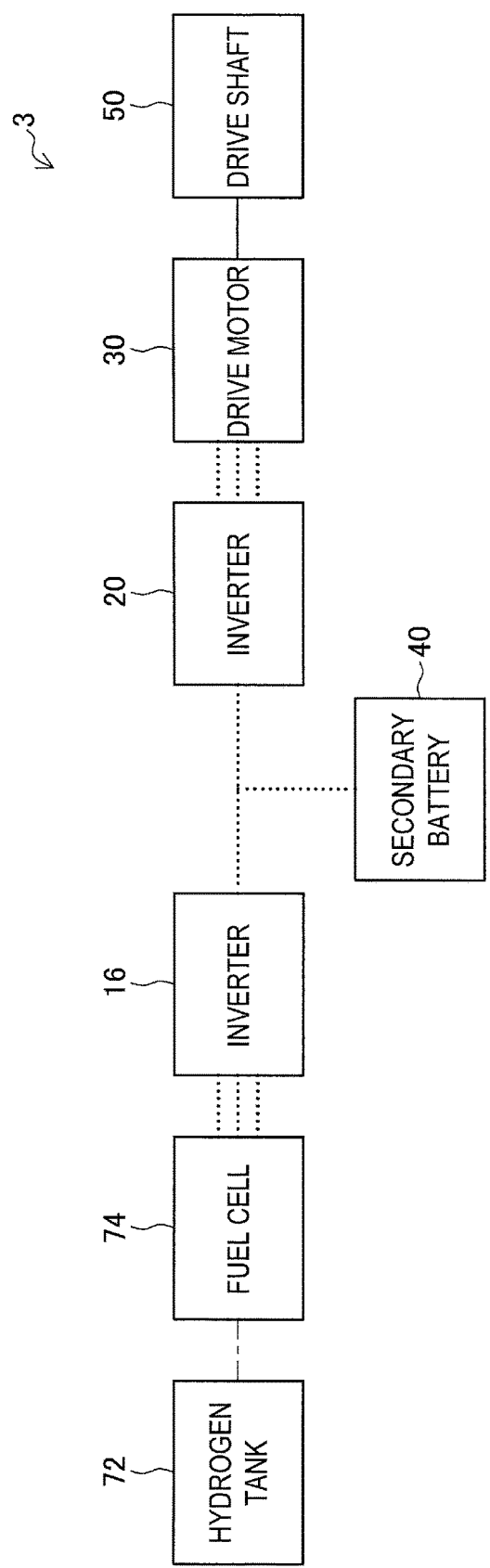
FIG. 8 is a schematic diagram illustrating a configuration example of a system of a fuel cell hybrid vehicle.

For example, the electricity generating system is used, in which a motor used as the generator 14 generates electricity with the power of the engine 12 in the above-described implementation, but the present disclosure is not limited to the example. As illustrated in FIG. 8, a fuel cell vehicle (FCV) 3 including a hydrogen tank 72 and a fuel cell 74 may be used, the fuel cell vehicle (FCV) 3 using an electricity generating system in which hydrogen reacts with oxygen in the fuel cell 74 and electricity is generated. Even in this case, it is possible to decrease the amount of hydrogen necessary for generating electricity and to prevent the fuel cell from degrading.

The cruise mode returns to the EV mode at the time at which an external charger is connected in the above-described implementation, but the present disclosure is not limited to the example. For example, it is also possible to determine that external charging is performed, on the basis of a charging current or charging voltage of a charger. It is also possible to determine that external charging is performed, on the basis of a charge start signal, a charge completion signal, or a charge stop signal based on an operation button for issuing an instruction for a charge start, after an external charger is connected, the operation button being installed in the vehicle, or on the external charger or a communication terminal. Furthermore, a combination of the facts that an external charger is connected and that the remaining capacity SOC becomes greater than or equal to a predetermined value may be used to determine that external charging is performed.

The invention claimed is:

1. A vehicle control device capable to switch between a first cruise mode in which a vehicle, equipped with the vehicle control device, is configured to travel on a driving force of a drive motor while a generator is stopped, and a second cruise mode in which the vehicle is configured to travel on a driving force of the drive motor while the generator generates electricity, the vehicle control device comprising:
a remaining capacity detecting module configured to detect a remaining capacity of a secondary battery which is configured to supply electric power to the drive motor;
an external charging detection module configured to detect a first state in which an external charger charges the secondary battery; and
a cruise mode switching module configured to:
switch a cruise mode from the first cruise mode to the second cruise mode based on the remaining capacity; and
switch the cruise mode from the second cruise mode to the first cruise mode based on detection of an external charging operation by the external charging detection module, wherein:
in an event the cruise mode is switched to the second cruise mode, the cruise mode switching module is further configured to switch an engine control mode to a standby mode for maintaining an engine in a second state in which the engine is capable of being quickly started, and
while the cruise mode is in the first cruise mode, the cruise mode switching module is further configured to switch the engine control mode to a sleep mode in which a power consumption is less than a power consumption in the standby mode.

2. The vehicle control device according to claim 1, further comprising:
an electricity generation mode switching module configured to set, in the second cruise mode,
an electricity generation execution mode that causes the generator to generate the electricity from a time at which the remaining capacity falls below a determined lower determination value to a time at which the remaining capacity becomes greater than or equal to a determined upper determination value, and
an electricity generation stop mode that causes the generator to stop generation of the electricity from a time at which the remaining capacity becomes greater than or equal to the upper determination value to a time at which the remaining capacity becomes less than the lower determination value.

3. The vehicle control device according to claim 1, wherein the standby mode includes at least one of processes that monitors a crank angle of the engine, drives a fuel pressure pump, conducts electricity to a glow plug, activates a sensor, or conducts electricity to a heater.

4. The vehicle control device according to claim 2, wherein the standby mode includes at least one of processes that monitors a crank angle of the engine, drives a fuel pressure pump, conducts electricity to a glow plug, activates a sensor, or conducts electricity to a heater.

5. The vehicle control device according to claim 1, wherein the cruise mode switching module is configured to switch the cruise mode from the second cruise mode to the first cruise mode at a time at which the external charging operation is detected.

6. A vehicle, comprising:
   a drive motor configured to drive the vehicle;
   a secondary battery configured to supply electric power to the drive motor;
   a generator configured to generate electric power to be supplied to at least one of the drive motor or the secondary battery; and
   a vehicle control device capable to switch between a first cruise mode in which the vehicle, equipped with the vehicle control device, is configured to travel on a driving force of the drive motor while the generator is stopped, and a second cruise mode in which the vehicle is configured to travel on a driving force of the drive motor while the generator generates electricity,
   wherein the vehicle control device comprising:
      a remaining capacity detecting module configured to detect a remaining capacity of the secondary battery which is configured to supply electric power to the drive motor;
      an external charging detection module configured to detect a first state in which an external charger charges the secondary battery; and
      a cruise mode switching module configured to:
         switch a cruise mode from the first cruise mode to the second cruise mode based on the remaining capacity; and
         switch the cruise mode from the second cruise mode to the first cruise mode based on detection of an external charging operation by the external charging detection module, wherein:
            in an event the cruise mode is switched to the second cruise mode, the cruise mode switching module is further configured to switch an engine control mode to a standby mode for maintaining an engine in a second state in which the engine is capable of being quickly started, and
            while the cruise mode is in the first cruise mode, the cruise mode switching module is further configured to switch the engine control mode to a sleep mode in which a power consumption is less than a power consumption in the standby mode.

7. The vehicle according to claim 6, wherein the vehicle control device further comprises:
   an electricity generation mode switching module configured to set, in the second cruise mode,
   an electricity generation execution mode that causes the generator to generate the electricity from a time at which the remaining capacity falls below a determined lower determination value to a time at which the remaining capacity becomes greater than or equal to a determined upper determination value, and
   an electricity generation stop mode that causes the generator to stop generation of the electricity from a time at which the remaining capacity becomes greater than or equal to the upper determination value to a time at which the remaining capacity becomes less than the lower determination value.

8. The vehicle according to claim 7, wherein the standby mode includes at least one of processes that monitors a crank angle of the engine, drives a fuel pressure pump, conducts electricity to a glow plug, activates a sensor, or conducts electricity to a heater.

9. The vehicle according to claim 6, wherein the standby mode includes at least one of processes that monitors a crank angle of the engine, drives a fuel pressure pump, conducts electricity to a glow plug, activates a sensor, or conducts electricity to a heater.

* * * * *